United States Patent
Algüera Gallego

(10) Patent No.: US 8,297,639 B2
(45) Date of Patent: Oct. 30, 2012

(54) METHOD AND CONTROL SYSTEM FOR A FIFTH WHEEL COUPLING SLIDING DEVICE HAVING A DISTANCE MEASUREMENT FOR DETECTING OBSTRUCTIONS

(75) Inventor: José Manuel Algüera Gallego, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 0 days.

(21) Appl. No.: 13/263,422

(22) PCT Filed: Apr. 8, 2010

(86) PCT No.: PCT/EP2010/054661
§ 371 (c)(1),
(2), (4) Date: Oct. 24, 2011

(87) PCT Pub. No.: WO2010/115965
PCT Pub. Date: Oct. 14, 2010

(65) Prior Publication Data
US 2012/0032415 A1    Feb. 9, 2012

(30) Foreign Application Priority Data

Apr. 9, 2009 (DE) .......................... 10 2009 002 335

(51) Int. Cl.
*B62D 53/08* (2006.01)
(52) U.S. Cl. ..................... 280/438.1; 280/432; 280/433; 280/449; 280/451; 701/49
(58) Field of Classification Search .................. 180/169, 180/274, 275, 282, 167, 271, 9.1; 307/10.1; 701/46, 48, 301, 45; 280/735, 423.1, 432, 280/433, 438.1, 449, 451, 468, 755
See application file for complete search history.

(56) References Cited

U.S. PATENT DOCUMENTS

| 3,848,914 A | 11/1974 | Wathen |
| 5,734,336 A * | 3/1998 | Smithline ..................... 340/903 |
| 2004/0061598 A1 | 4/2004 | King |
| 2005/0128060 A1* | 6/2005 | Rennick et al. ............... 340/435 |
| 2009/0072515 A1* | 3/2009 | Alguera et al. ............ 280/441.1 |

FOREIGN PATENT DOCUMENTS

| DE | 10 2004 045 662 A1 | 3/2006 |
| DE | 10 2005 060 124 A1 | 6/2007 |
| WO | 2005 027076 A1 | 3/2005 |
| WO | 2007 068762 A1 | 6/2007 |

* cited by examiner

*Primary Examiner* — Tashiana Adams
*Assistant Examiner* — Jacob Knutson
(74) *Attorney, Agent, or Firm* — Hudak, Shunk & Farine Co. LPA

(57) ABSTRACT

A method and to a system for controlling a sliding device for a fifth wheel coupling arranged on a towing vehicle, wherein the sliding device includes a substructure having at least one guide rail oriented in the driving direction, a movable slide, which supports the fifth wheel coupling and engages on the guide rail, and a control unit, to which a motorized drive unit for moving the slide and an actuator for fixing the slide relative to the guide rail are connected. The aim was to provide a method and a control system with which a sufficiently large gap width (W) can be set between the towing vehicle and the trailer in a timely manner. This is achieved, among other things, by a method in which a distance measurement is performed to detect an obstruction in front of the towing vehicle, the signal of the measurement is processed into a control signal in the control unit, and a start-up of the motorized drive unit and/or the actuator is initiated therewith.

13 Claims, 2 Drawing Sheets

METHOD AND CONTROL SYSTEM FOR A FIFTH WHEEL COUPLING SLIDING DEVICE HAVING A DISTANCE MEASUREMENT FOR DETECTING OBSTRUCTIONS

FIELD OF THE INVENTION

The invention relates to a method for control of a sliding device for a fifth wheel coupling arranged on a towing vehicle, wherein the sliding device comprises a substructure having at least one guide rail oriented in the driving direction, a movable slide, which supports the fifth wheel coupling and engages on the guide rail, and a control unit, to which a motorized drive unit for moving the slide and an actuator for fixing the slide relative to the guide rail are connected. Furthermore, a control system for a sliding device that is especially suited to implementing the method of the invention is placed under protection.

BACKGROUND OF THE INVENTION

Such a sliding device is known, for example, from DE 10 2005 060 124 A1 With the help of a motorized drive unit, a slide with the fifth wheel coupling located thereon can be moved in the lengthwise axis of the vehicle on two parallel disposed guide rails and locked in a predetermined position. When driving fast on the expressway with few curves, the fifth wheel coupling should be moved as close as possible to the driver's cabin, in order to keep the gap between the driver's cabin and the front of the trailer as small as possible and minimize turbulence in this area. According to the known publication, the control unit of the sliding device is connected to the vehicle's control unit so that information as to the vehicle's speed can be called up and the gap between towing vehicle and trailer can thus be adjusted in controlled operation. However, this leads to the problem that the trailer, drawn up as close as possible to the driver's cabin, cannot easily swing past the driver's cabin when negotiating a tight curve, and the corners of the trailer will strike the driver's cabin. This problem also exists with a panic braking, that is, a sudden full braking without avoidance maneuver, which is recognized by evaluation of a braking signal going into the control unit and triggering an extremely rapid backward movement of the slide to increase the gap size.

Another prior art is disclosed by DE 10 2004 045 662 A1 with a sliding device, whose slide position is detected by a position sensor. The signal of the position sensor is provided to a control mechanism. When the gap is too narrow between driver's cabin and front of the trailer, it can also activate the drive unit of the sliding device and thereby move the slide backward.

In practice, however, it has been found that the detecting of the braking signal and the vehicle's speed are ill suited to recognizing a panic braking in good time. This produces extremely short response times for the systems, often not allowing a backward movement of the fifth wheel coupling to a rear position and, thus, the necessary spacing between trailer and driver's cabin.

For this reason, the problem of the invention was to provide a method and a control system making possible a timely adjustment of a sufficiently large gap width between towing vehicle and trailer.

SUMMARY OF THE INVENTION

The problem is solved according to the invention with a method in which a distance measurement is performed to detect an obstruction in front of the towing vehicle, the signal of the measurement is processed into a control signal in the control unit, and a start-up of the motorized drive unit and/or the actuator is initiated therewith.

In the frequently used sliding devices, the slide is moved on two parallel guide rails by means of a motorized drive unit, such as a hydraulic cylinder, and after reaching the intended position it is secured at both sides to the guide rails. For this, an actuator such as a pneumatically or hydraulically operated cylinder usually moves locking pieces in the direction of the guide rails and is brought into form-fitting engagement with them. This locking of the slide to the guide rails takes strain off the motorized drive unit, especially during heavy braking or collisions.

Instead of a form-fitting locking, it is also possible to dimension the motorized drive unit with sufficient size and do without additional form-fit locking elements. In this embodiment, by actuator is meant a blocking valve, which entraps the fluid located in the interior of the cylinder.

During fast travel on the expressway, the trailer is brought up close to the driver's cabin of the towing vehicle by the sliding device, in order to keep the gap width between driver's cabin and front of the trailer as narrow as possible. This minimizes turbulence and, thus, also the fuel consumption. In event of a sudden avoidance maneuver, the fixation of the slide is released and the slide is pushed back on the guide rails. With the help of the method of the invention, the road situation in front of the vehicle is monitored and any obstacles located there are identified. In this way, it is possible to take steps to increase the gap width between driver's cabin and trailer front even before the response of the drive.

This can preferably be done in that, upon reaching a predetermined first response distance from the obstacle, the motorized drive unit and/or the actuator are switched by the control unit into a readiness position. Then, if the driver performs a full braking, possibly with an abrupt steering movement, the backward movement of the slide can occur without any delay in time.

In the readiness position, in particular, a hydraulic pump of the motorized drive unit can start running. In this way, the motorized drive unit, most often designed as a hydraulic cylinder, can immediately provide the necessary system pressure so as to push back the slide with attached trailer, despite the initiated braking process.

Advisedly, upon reaching a second predetermined shorter response distance, the fixation of the slide is released and the slide is pushed by the motorized drive unit into a rear position. In this scenario, there is no response from the driver and the articulated vehicle formed from towing vehicle and trailer approaches the obstacle with undiminished speed. In this phase, the slide is automatically forced into a position to the rear of the guide rails, since a full braking and/or sharp avoidance maneuver seem unavoidable.

Advantageously, the slide is fixed in the rear position by means of the actuator. In particular, an additional gain in safety is achieved by a form-fitting engagement of locking pieces located on the actuator with the guide rails, since the slide cannot be held solely by the motorized drive unit.

The invention is likewise implemented for a control system, in which the control unit is connected to a distance sensor, which in the case of an obstacle located in front of the towing vehicle provides a measured value, and it interacts with the drive unit and/or the actuator.

Preferably, the distance sensor is part of the towing vehicle's distance recognition system. The distance recognition system serves to identify obstacles and automatically initiates a braking process with no response by the driver as the articulated vehicle steadily approaches it. If such a distance recognition system is present, the control unit can obtain the required measurement value from it.

The distance sensor can be a radar, lidar, or infrared sensor. The radar principle is based on electromagnetic waves in the radio spectrum, which are sent out as a so-called primary signal and are received and evaluated as a secondary signal reflected by objects. Lidar stands for "light detection and ranging" and is a method very similar to radar for measuring distance and speed. Instead of radio waves, as with radar, however, laser beams are used.

The distance maintaining system can also be part of the steering stability system or comprise such a system. In this case, the roadway dividing line constitutes the obstacle. The steering stability system responds by sending a signal when the towing vehicle leaves the roadway without major steering activity. This signal can also be used to place the system in a readiness position and/or initiate the movement of the slide into a rear position, since often when the vehicle leaves the roadway due to driver fatigue, for example, a sudden steering maneuver often occurs to return the vehicle to the roadway.

BRIEF DESCRIPTION OF THE DRAWINGS

For better comprehension, the invention will now be explained more closely by means of three figures. There are shown.

DETAILED DESCRIPTION OF THE INVENTION

Figure 1:
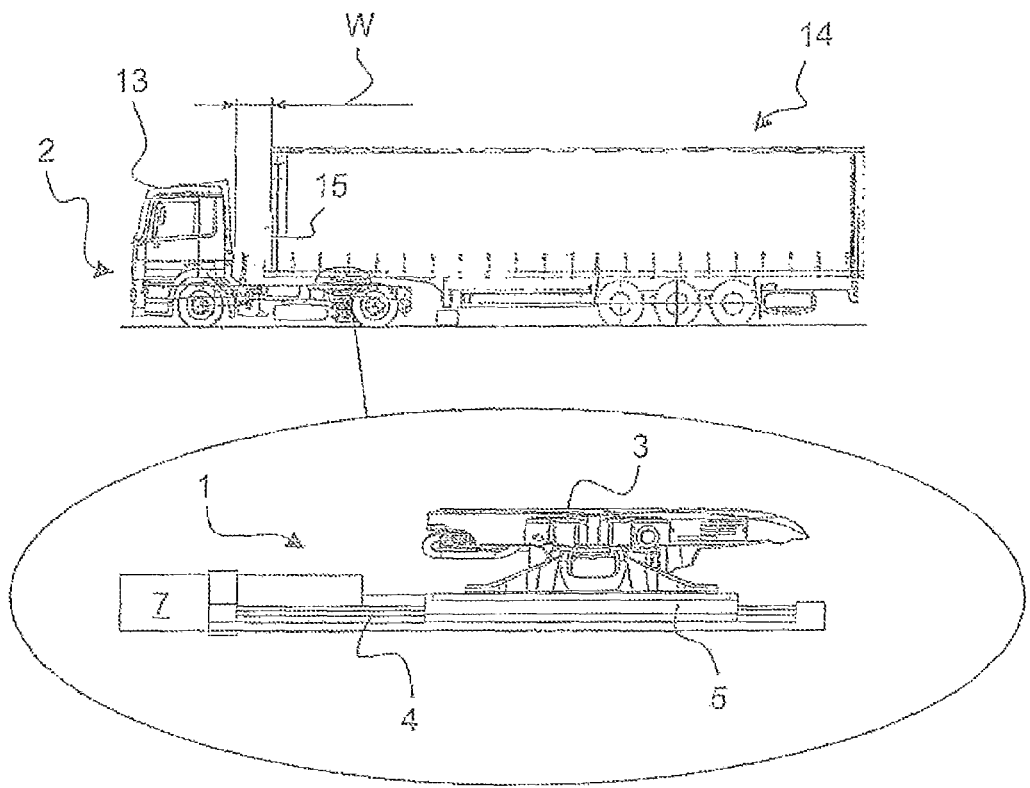
FIG. 1: a side view of a towing vehicle with a sliding device and attached trailer according to the prior art.

FIG. 1 shows in a schematic side view an articulated vehicle with a towing vehicle 2 and a trailer 14 mechanically attached to it. The mechanical connection between the vehicles 2, 14 occurs via a fifth wheel coupling 3, which is arranged on a slide 6 and can move in the vehicle's lengthwise axis on two guide rails 4 spaced parallel to each other. The movement of the fifth wheel coupling 3 occurs during driving operation by its own specially provided motorized drive unit 7 in the form of a hydraulic cylinder and serves primarily to adjust the gap width W between the rear side of the driver's cabin 13 and the front of the trailer 15.

Figure 2:
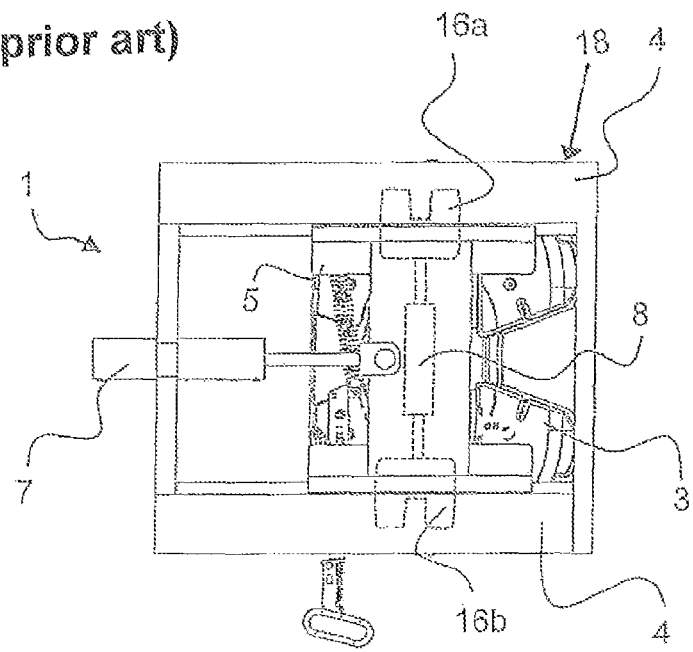
FIG. 2: a bottom view of the sliding device represented in FIG. 1.

The sliding device 1 can be seen in an enlarged bottom view in FIG. 2 and includes a substructure 18 having at least one guide rail 4. On the slide 5 there is an actuator 8, at right angles to the guide rails 4 with locking pieces 16a, 16b formed at the end, engaging in form-fitting manner with, complementary seats (not shown) of the guide rails 4 and thereby locking the slide 5 to the guide rails 4. Before a movement of the slide 5 with the motorized drive unit 7, the locking pieces 16a, 16b are retracted via the actuator 8, which releases the mechanical locking.

Figure 3:
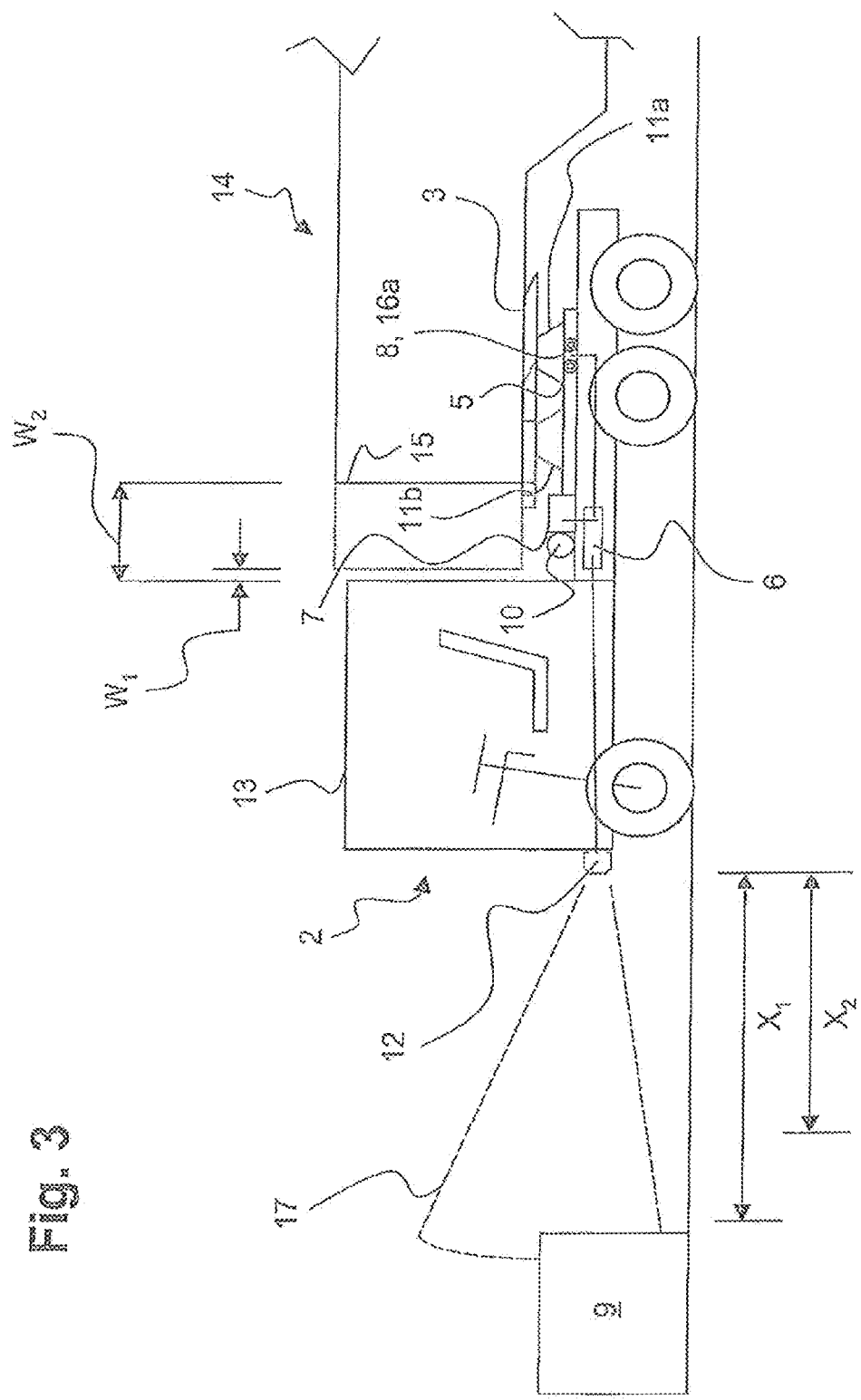
FIG. 3: a schematic side view of an articulated vehicle with the control system according to the invention.

FIG. 3 shows a rear position 11a and a front position 11b of the slide 5 and, thus, the front of the trailer 15, where for sake of clarity the front position 11b is shown with dotted lines. The front position 11b corresponds to the minimum gap width $W_1$ and the rear position 11a to the maximum gap width $W_2$. The minimum gap width $W_1$ is dimensioned such that a full swinging of the front of the trailer 15 without a collision with the driver's cabin 13 is not possible.

The control system according to the invention, shown in FIG. 3, comprises a distance sensor 12 arranged at the front side of the towing vehicle 2, which surveys the road lying in front of the towing vehicle 2 for possible obstacles 9. For this, the distance sensor 12 sends out a measuring lobe 17 in advance of the towing vehicle 2 in its direction of travel. Once the distance sensor 12 detects an obstacle at the response distance $X_1$, a corresponding signal is relayed to an electronic control unit 6, which thereupon sets the hydraulic pump 10 or a comparable motor in operation.

If the driver shows no response and the obstacle 9 has drawn near as far as the second response distance $X_2$, the slide 5 with the trailer 14 is pushed back by the motorized drive unit 7 and the maximum gap width $W_2$ is established. After producing the maximum gap width $W_2$, even extreme avoidance maneuvers are possible, since the front of the trailer 15 can swing past the rear of the driver's cabin 13.

LIST OF REFERENCE NUMBERS 1 sliding device
2 towing vehicle
3 fifth wheel coupling
4 guide rail
5 slide
6 control unit
7 motorized drive unit
8 actuator
9 obstacle
10 hydraulic pump
11a rear position of the slide
11b front position of the slide
12 distance sensor
13 driver's cabin
14 trailer
15 front of the trailer
16a,b locking piece, actuator
17 measuring lobe
18 substructure
$X_1$ first response distance
$X_2$: second response distance
W towing vehicle/trailer gap width
$W_1$ minimum gap width
$W_2$ maximum gap width

What is claimed is:

1. A method for control of a sliding device for a fifth wheel coupling arranged on a towing vehicle, wherein the sliding device comprises a substructure having at least, one guide rail oriented in a driving direction, a movable slide, which supports the fifth wheel coupling and engages on the guide rail, and a control unit, to which a motorized drive unit for moving the slide and an actuator for fixing the slide relative to the guide rail are connected, comprising the steps of performing a distance measurement to detect an obstruction in front of the towing vehicle, processing the signal of the measurement into a control signal in the control unit and initiating a start-up of one or more of the motorized drive unit and the actuator therewith.

2. The method according to claim 1, wherein upon reaching a predetermined first response distance ($X_1$) from the obstacle, one or more of the motorized drive unit and the actuator are switched by the control unit into a readiness position.

3. The method according to claim 2, wherein in the readiness position a hydraulic pump of the motorized drive unit starts running.

4. The method according to claim 2, wherein upon reaching a second predetermined response distance ($X_2$), the fixation of the slide is released and the slide is pushed by the motorized drive unit into a rear position.

5. The method according to claim 4, wherein the slide is fixed in the rear position by means of the actuator.

6. A control system for control of a sliding device for a fifth wheel coupling arranged on a towing vehicle, comprising: the sliding device that comprises a substructure having at least one guide rail oriented in a driving direction, a movable slide, which support the fifth wheel coupling and engages on the guide rail, and a control unit, to with a motorized drive unit for moving the slide and an actuator for fixing the slide relative to the guide rail are connected, wherein the control unit is connected to a distance sensor, which in the case of an obstacle located in front of the towing vehicle provides a measured value, and the control unit interacts with one or more of the drive unit and the actuator.

7. The control system according to claim 6, wherein the distance sensor is part of a distance recognition system of the towing vehicle.

8. The control system according to claim 6, wherein the distance sensor is a radar, lidar, or infrared sensor.

9. The control system according to claim 6, wherein the distance sensor is part of a steeling stability system of the towing vehicle.

10. The method according to claim 3, wherein upon reaching a second predetermined response distance ($X_2$), the fixation of the slide is released and the slide is pushed by the motorized drive unit into a rear position.

11. The method according to claim 10, wherein the slide is fixed in the rear position by means of the actuator.

12. The control system according to claim 7, wherein the distance sensor is a radar, lidar, or infrared sensor.

13. The control system according to claim 12, wherein the distance sensor is part of a steering stability system of the towing vehicle.

* * * * *